US010648620B2

(12) United States Patent  
Yeggy et al.

(10) Patent No.: US 10,648,620 B2  
(45) Date of Patent: May 12, 2020

(54) VENTED FITTING FOR PRESSURE VESSEL BOSS

(71) Applicant: Hexagon Technology AS, Alesund (NO)

(72) Inventors: Brian Yeggy, Lincoln, NE (US); Duane V. Byerly, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 320 days.

(21) Appl. No.: 15/460,340

(22) Filed: Mar. 16, 2017

(65) Prior Publication Data

US 2017/0268725 A1     Sep. 21, 2017

Related U.S. Application Data

(60) Provisional application No. 62/308,945, filed on Mar. 16, 2016.

(51) Int. Cl.
*F16C 13/00*     (2006.01)
*F17C 1/06*     (2006.01)
(Continued)

(52) U.S. Cl.
CPC ............ *F17C 13/002* (2013.01); *B23P 15/00* (2013.01); *F17C 1/06* (2013.01); *F17C 1/14* (2013.01);
(Continued)

(58) Field of Classification Search
CPC .. F17C 13/002; F17C 1/06; F17C 1/14; F17C 1/16; F17C 2201/0109; F17C 2201/056;
(Continued)

(56) References Cited

U.S. PATENT DOCUMENTS 2,507,778 A    5/1950   Frey  
3,137,405 A    6/1964   Gorcey  
(Continued)

FOREIGN PATENT DOCUMENTS

CN        103814248 A    5/2014  
FR         3015629 A1    6/2015  
(Continued)

OTHER PUBLICATIONS

International Search Report and Written Opinion dated Jun. 27, 2017 for International Application No. PCT/US2017/022655.

(Continued)

*Primary Examiner* — Robert J Hicks  
(74) *Attorney, Agent, or Firm* — Mai-Tram D. Lauer; Westman, Champlin & Koehler, P.A.

(57) ABSTRACT

An apparatus is configured to be positioned between a boss and a shell of a pressure vessel. The boss includes a bore therethrough, and the bore has a longitudinal axis. The apparatus includes an annular body and a gas permeable feature. The annular body includes an inner surface configured to abut the boss and an outer surface configured to abut the shell. The annular body has opposite first and second ends relative to the longitudinal axis. The gas permeable feature is provided on the inner surface and extends at least from the first end to the second end. The disclosure also describes a pressure vessel including a shell, and boss, and an apparatus positioned between the boss and the shell. A method for forming a pressure vessel includes mounting a boss on a mandrel, positioning an annular fitting about a neck of the boss, forming a liner, and forming an outer shell.

15 Claims, 7 Drawing Sheets

(51) Int. Cl.
*B23P 15/00* (2006.01)
*F17C 1/14* (2006.01)
*F17C 1/16* (2006.01)
*F17C 13/00* (2006.01)

(52) U.S. Cl.
CPC ........ *F17C 1/16* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0636* (2013.01); *F17C 2203/0646* (2013.01); *F17C 2203/0663* (2013.01); *F17C 2205/0305* (2013.01); *F17C 2209/2163* (2013.01); *F17C 2221/011* (2013.01); *F17C 2221/012* (2013.01); *F17C 2221/014* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/035* (2013.01); *F17C 2260/011* (2013.01); *F17C 2260/037* (2013.01); *F17C 2260/04* (2013.01); *F17C 2270/0168* (2013.01); *Y02E 60/321* (2013.01)

(58) Field of Classification Search
CPC ...... F17C 2203/0604; F17C 2203/0619; F17C 2203/0636; F17C 2203/0646; F17C 2203/066; F17C 2203/0663; F17C 2205/0305; F17C 2209/2163; F17C 2221/011; F17C 2221/012; F17C 2221/014; F17C 2221/033; F17C 2221/035; F17C 2223/0123; F17C 2223/0153; F17C 2223/033; F17C 2223/035; F17C 2260/011; F17C 2260/037; F17C 2260/04; F17C 2270/0168; F17C 13/00; F17C 1/04; F17C 1/02; B23P 15/00; Y02E 60/321
USPC ................ 220/586, 588, 589, 62.22; 206/0.6
See application file for complete search history.

(56) References Cited

U.S. PATENT DOCUMENTS

| | | | |
|---|---|---|---|
| 3,368,586 A | 2/1968 | French | |
| 3,735,475 A | 5/1973 | Marriott | |
| 3,815,773 A * | 6/1974 | Duvall | F16J 12/00 |
| | | | 220/590 |
| 4,215,798 A | 8/1980 | Patterson | |
| 4,777,982 A | 10/1988 | Borowitz | |
| 5,287,988 A | 2/1994 | Murray | |
| 7,036,677 B1 | 5/2006 | Funck | |
| 7,870,971 B2 | 1/2011 | Schlag | |
| 8,608,014 B2 | 12/2013 | Mueller | |
| 2010/0072209 A1 | 3/2010 | Hatta | |
| 2011/0240655 A1 | 10/2011 | Lindner | |
| 2012/0048865 A1* | 3/2012 | Eihusen | F17C 13/002 |
| | | | 220/586 |
| 2013/0341235 A1* | 12/2013 | Leavitt | F17C 1/16 |
| | | | 206/524.2 |
| 2014/0008373 A1* | 1/2014 | Sharp | F17C 1/06 |
| | | | 220/586 |
| 2014/0103051 A1 | 4/2014 | Kanezaki | |
| 2014/0203026 A1 | 7/2014 | Jaeger | |

FOREIGN PATENT DOCUMENTS

| | | |
|---|---|---|
| JP | 2009174700 A | 8/2009 |
| JP | 2012127467 A | 7/2012 |
| JP | 2015155736 A | 8/2015 |
| RU | 2507436 C2 | 2/2014 |
| WO | 2010091062 A1 | 8/2010 |
| WO | 2012074815 A2 | 6/2012 |
| WO | 2013080810 A1 | 6/2013 |

OTHER PUBLICATIONS

Chinese Office Action for corresponding Chinese Patent Application No. 201780017715.X, dated Feb. 21, 2020.
Russian Office Action for corresponding Russian Patent Application No. 2018136201, dated Feb. 14, 2020,.

* cited by examiner

VENTED FITTING FOR PRESSURE VESSEL BOSS

CROSS-REFERENCE TO RELATED APPLICATION

This application claims the benefit of priority from U.S. Provisional Patent Application Ser. No. 62/308,945, filed Mar. 16, 2016, entitled "Vented Fitting for Pressure Vessel Boss," which is hereby incorporated in its entirety.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages, including lightness in weight and resistance to corrosion, fatigue and catastrophic failure. These attributes are due at least in part to the high specific strengths of the reinforcing fibers or filaments.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, the liner 20 is formed of blow molded high density polyethylene (HDPE).

FIG. 1 illustrates an elongated pressure vessel 10, such as that disclosed in U.S. Pat. No. 5,476,189, entitled "Pressure vessel with damage mitigating system," which is hereby incorporated by reference. Vessel 10 has a main body section 12 and substantially hemispherical or dome-shaped end sections 14. A boss 16, typically constructed of aluminum, is provided at one or both ends of the vessel 10 to provide a port for communicating with the interior of the vessel 10. As shown in FIG. 2, vessel 10 is formed with an inner polymer liner 20 covered by an outer composite shell 18. The composite shell 18 resolves structural loads on the vessel 10.

FIG. 2 illustrates a partial cross-sectional view, taken along line 2-2 of FIG. 1, of a typical end section 14 including boss 16, such as that disclosed in U.S. Pat. No. 5,429,845, entitled "Boss for a filament wound pressure vessel," which is hereby incorporated by reference. The boss 16 typically has a neck 22, a port 26 allowing fluid communication with the interior of vessel 10, and an annular flange 24 extending radially from port 26. Boss 16 is fit to outer shell 18 and liner 20 such that port 26 extends between the interior and exterior of pressure vessel 10. Typically, shell 18 abuts neck 22. Generally, flange 24 is contained between portions of liner 20 and/or is sandwiched between the liner 20 and the shell 18. In certain embodiments, flange 24 may include at least one annular groove 32 shaped to accept corresponding annular tab(s) 34 on liner 20. This construction secures the boss 16 to the vessel 10 and provides a seal at the interfaces between the boss 16, shell 18, and liner 20.

A method of forming a pressure vessel 10 includes mounting a boss on a mandrel and allowing a fluid polymer material for liner 20 to flow around flange 24 and into groove 32 of boss 16. The liner material then solidifies, thereby forming a portions of liner 20 adjacent to flange 24 and tab 34 received within groove 32. Liner 20 is thereby mechanically interlocked with boss 16. Accordingly, even under extreme pressure conditions, separation of liner 20 from boss 16 is prevented.

In an exemplary embodiment, outer shell 18 is formed from wound fibers and surrounds the liner 20 and at least a portion of flange 24 of boss 16. In an exemplary method, a dispensing head for the fibers moves in such a way as to wrap the fiber on the liner 20 in a desired pattern. If the vessel 10 is cylindrical, rather than spherical, fiber winding is normally applied in both a substantially longitudinal (helical) and circumferential (hoop) wrap pattern. This winding process is defined by a number of factors, such as resin content, fiber configuration, winding tension, and the pattern of the wrap in relation to the axis of the liner 20. Details relevant to the formation of an exemplary pressure vessel are disclosed in U.S. Pat. No. 4,838,971, entitled "Filament Winding Process and Apparatus," which is incorporated herein by reference.

Although the liner 20 provides a gas barrier under typical operating conditions, the design of a pressure vessel 10 of this type produces a phenomenon wherein gas diffuses into the liner 20 under pressurization of vessel 10. When depressurization of the vessel 10 occurs, this gas diffuses out of the liner 20, and in some cases into the space between the liner 20 and the shell 18. A pocket of gas may be formed, causing the liner 20 to bulge slightly inward and possibly become stretched. Moreover, gas at the interface between the liner 20 and the shell 18 can promote undesirable separation between the liner 20 and shell 18. Additionally, upon re-pressurization, the gas trapped between liner 20 and shell 18 may be expelled abruptly through microcracks in shell 18 that form at high pressures. The relatively sudden expulsion of gas can set off leak detectors, when, in actuality, pressure vessel 10 exhibits no steady leak.

SUMMARY

In one aspect, an apparatus is configured to be positioned between a boss and a shell of a pressure vessel. The boss includes a bore therethrough, and the bore has a longitudinal axis. The apparatus includes an annular body and a gas permeable feature. The annular body includes an inner surface configured to abut the boss and an outer surface configured to abut the shell. The annular body has opposite first and second ends relative to the longitudinal axis. The gas permeable feature is provided on the inner surface and extends at least from the first end to the second end.

In another aspect, a pressure vessel includes a shell, and boss, and an apparatus positioned between the boss and the shell. The boss includes a bore therethrough, and the bore has a longitudinal axis. The apparatus includes an annular body and a gas permeable feature. The annular body includes an inner surface configured to abut the boss and an outer surface configured to abut the shell. The annular body has opposite first and second ends relative to the longitudinal axis. The gas permeable feature is provided on the inner surface and extends from the first end to the second end.

In another aspect, a method for forming a pressure vessel includes mounting a boss on a mandrel. The boss has a neck, the neck having a bore with a longitudinal axis. The boss has a flange that extends radially outwardly from the bore. The method includes positioning an annular fitting about the neck of the boss. The fitting includes opposite first and second ends relative to the longitudinal axis. The method includes forming the liner of the pressure vessel on at least a portion of the flange. The outer shell is formed to surround the liner, the flange, and the fitting. The method is performed so that a gas permeable feature extends at least from the first end to the second end.

This disclosure, in its various combinations, either in apparatus or method form, may also be characterized by the following listing of items:

1. An apparatus configured to be positioned between a boss and a shell of a pressure vessel, the boss including a bore therethrough, and the bore having a longitudinal axis, the apparatus including:
   an annular body including an inner surface configured to abut the boss and an outer surface configured to abut the shell, wherein the annular body has opposite first and second ends relative to the longitudinal axis; and
   a gas permeable feature provided on the inner surface and extending at least from the first end to the second end.
2. The apparatus of item 1, wherein the gas permeable feature includes a plurality of channels.
3. The apparatus of item 2, wherein at least one of the plurality of channels is substantially aligned with the longitudinal axis.
4. The apparatus of any of items 2-3, wherein at least some of the plurality of channels are substantially evenly circumferentially spaced about the inner surface.
5. The apparatus of any of items 2-4, wherein at least one of the plurality of channels has a substantially rectangular cross-sectional profile.
6. The apparatus of any of items 1-5, wherein the annular body includes a neck and a flange that extends radially from the neck.
7. A pressure vessel including:
   a shell;
   a boss including a bore therethrough, the bore having a longitudinal axis;
   an apparatus positioned between the boss and the shell, the apparatus including:
     an annular body including an inner surface configured to abut the boss and an outer surface configured to abut the shell, wherein the annular body has opposite first and second ends relative to the longitudinal axis; and
     a gas permeable feature provided on the inner surface and extending at least from the first end to the second end.
8. The pressure vessel of item 7 wherein the pressure vessel includes a liner disposed within the shell to form an interface between the liner and the shell, and wherein the gas permeable feature is in fluid communication with the interface at the first end and with an exterior of the vessel at the second end.
9. The pressure vessel of any of items 7-8 wherein the gas permeable feature includes a plurality of channels.
10. The pressure vessel of item 9, wherein at least one of the plurality of channels is substantially aligned with the longitudinal axis.
11. The pressure vessel of any of items 9-10, wherein at least some of the plurality of channels are substantially evenly circumferentially spaced about the inner surface.
12. The pressure vessel of any of items 7-11, wherein the annular body includes a neck and a flange that extends radially from the neck.
13. A method for forming a pressure vessel including:
   mounting a boss on a mandrel, the boss having a neck, the neck having a bore with a longitudinal axis, and the boss having a flange extending radially outwardly from the bore;
   positioning an annular fitting about the neck of the boss, the fitting including opposite first and second ends relative to the longitudinal axis;
   forming a liner of the pressure vessel on at least a portion of the flange; and
   forming an outer shell surrounding the liner, the flange, and the fitting;
   wherein a gas permeable features extends at least from the first end to the second end.
14. The method of item 13, wherein positioning the annular fitting about the neck of the boss occurs before forming the liner.
15. The method of any of items 13-14, wherein positioning the annular fitting about the neck of the boss occurs after forming the liner.
16. The method of any of items 13-15, wherein forming the liner includes disposing a non-metallic material around the mandrel and at least the portion of the flange.
17. The method of any of items 13-16, further including positioning the gas permeable feature on the liner before positioning the annular fitting about the neck of the boss.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions apply to the described elements as well as similarly numbered analogous elements.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
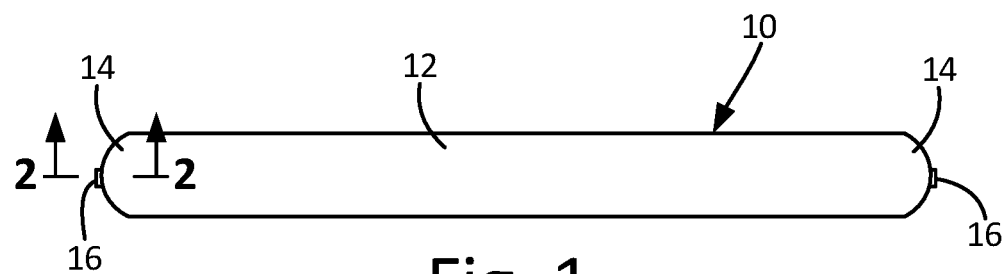
FIG. 1 is a side view of a typical pressure vessel.
Figure 2:
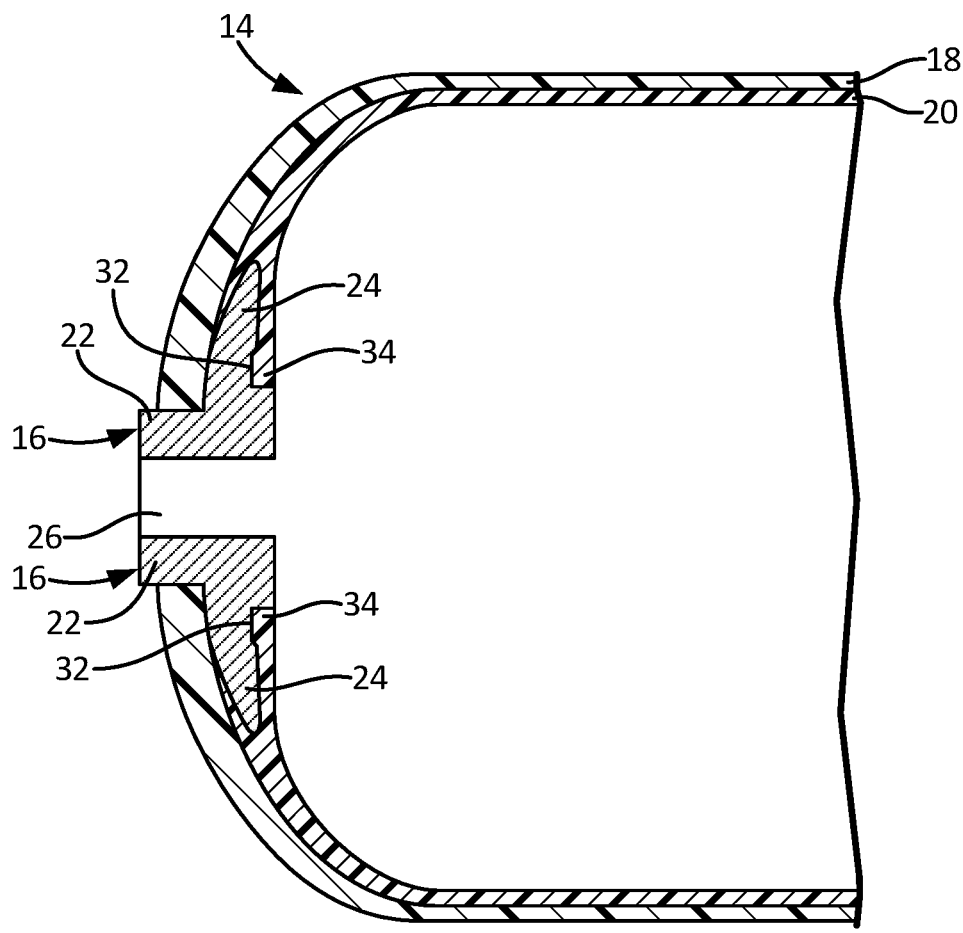
FIG. 2 is a partial cross-sectional view of one end of the pressure vessel of FIG. 1, taken along line 2-2 of FIG. 1 and showing a typical boss and liner.
Figure 3:
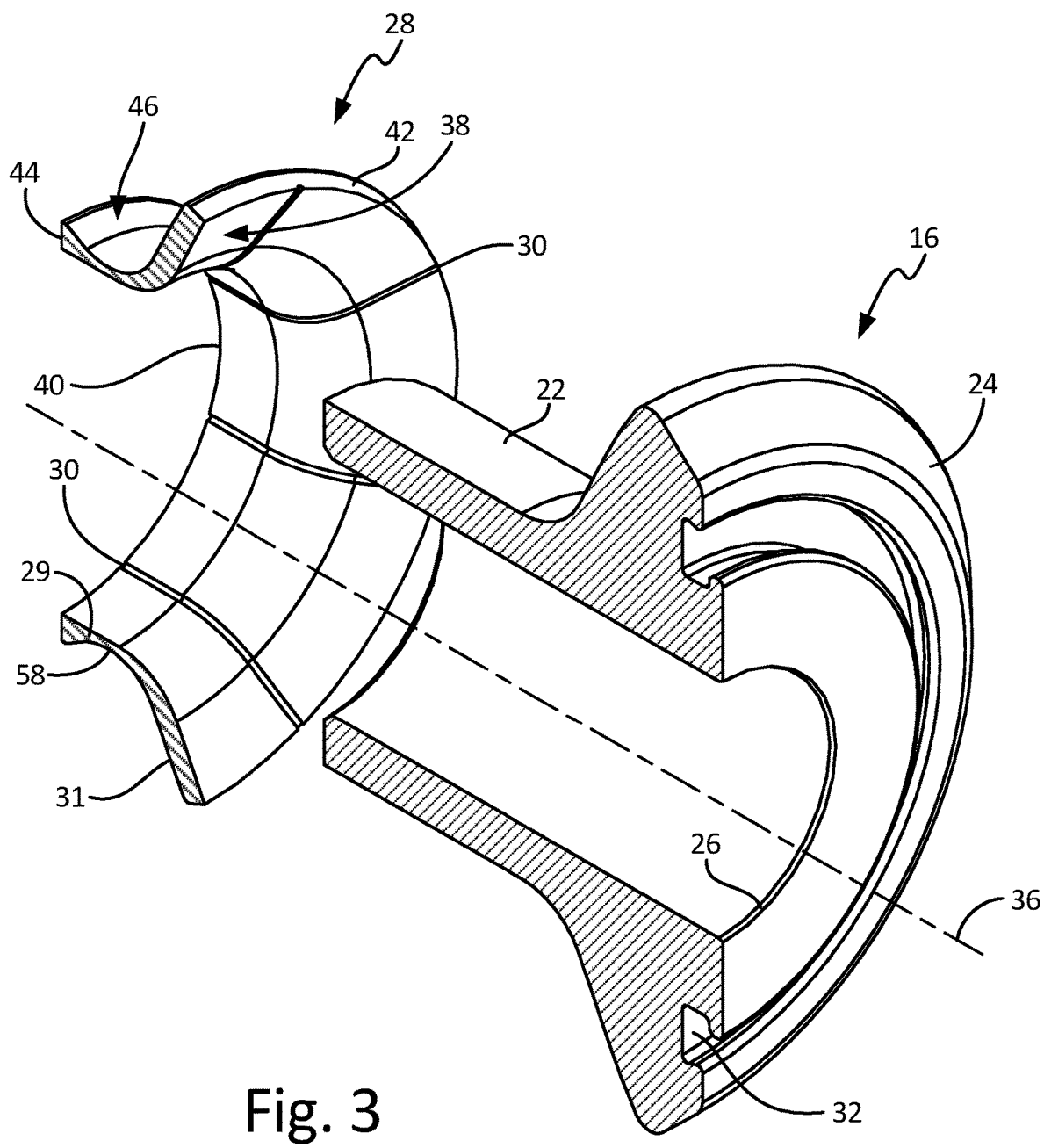
FIG. 3 is an exploded radial cross-sectional view of a boss and an exemplary vented fitting of the present disclosure.
Figure 6:
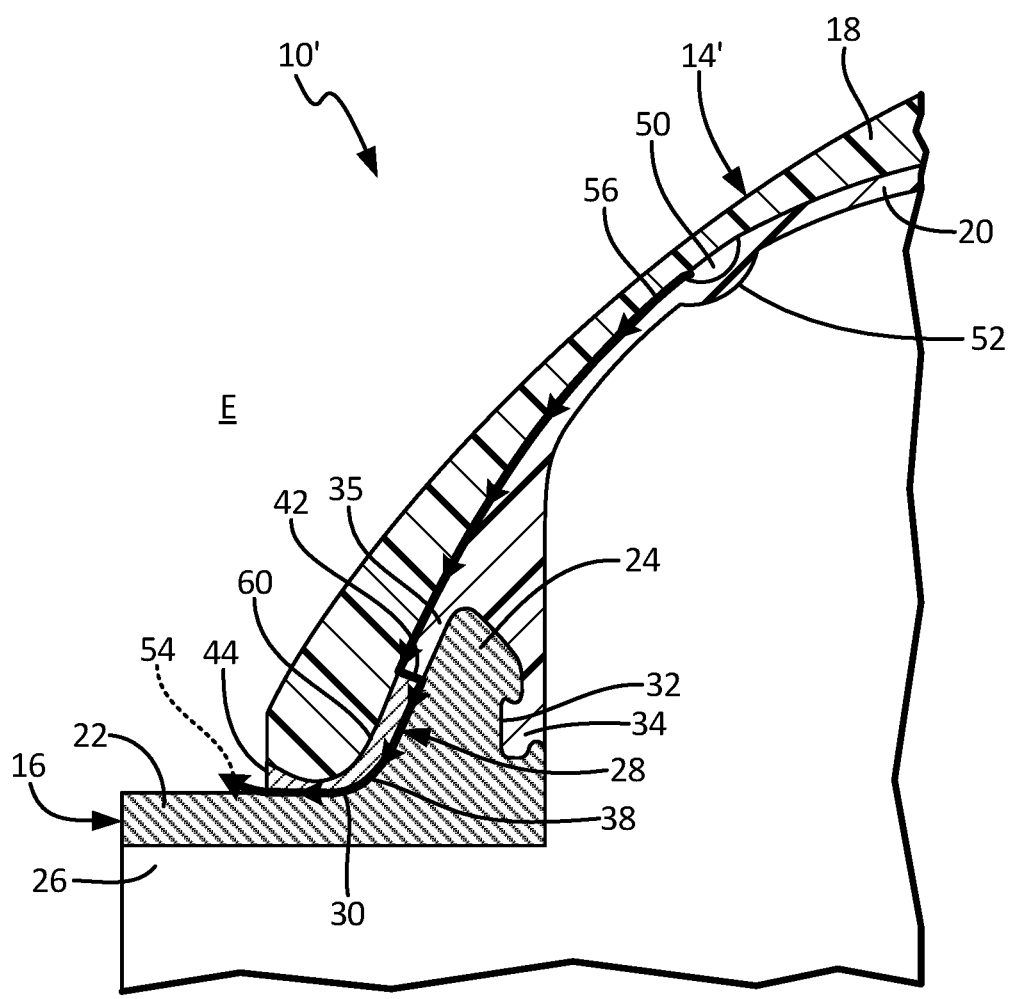
FIG. 6 is a partial radial cross-sectional view of the end section of FIG. 5, showing a gas venting path from an exaggerated gas pocket.

The present disclosure describes a fluid venting structure for use in a pressure vessel that prevents separation of the liner from the shell under pressure. The disclosed apparatus allows venting of gas trapped between the liner and the shell. This disclosure relates, in one aspect, to a fitting 28, provided in the form of a sleeve in an exemplary embodiment, that is placed over portions of a boss 16 of a pressure vessel 10. Fitting 28 has features to allow gas that accumulates between liner 20 and shell 18 to vent to the atmosphere outside of pressure vessel 10. For example, as shown in FIGS. 3 and 6, channels 30 on fitting 28 provide paths through which gas may vent from an interface 56 between shell 18 and liner 20 to the environment exterior to pressure vessel 10. Thus, potential damage to liner 20 and unwanted venting through shell 18 can be reduced or prevented.

Figure 5:
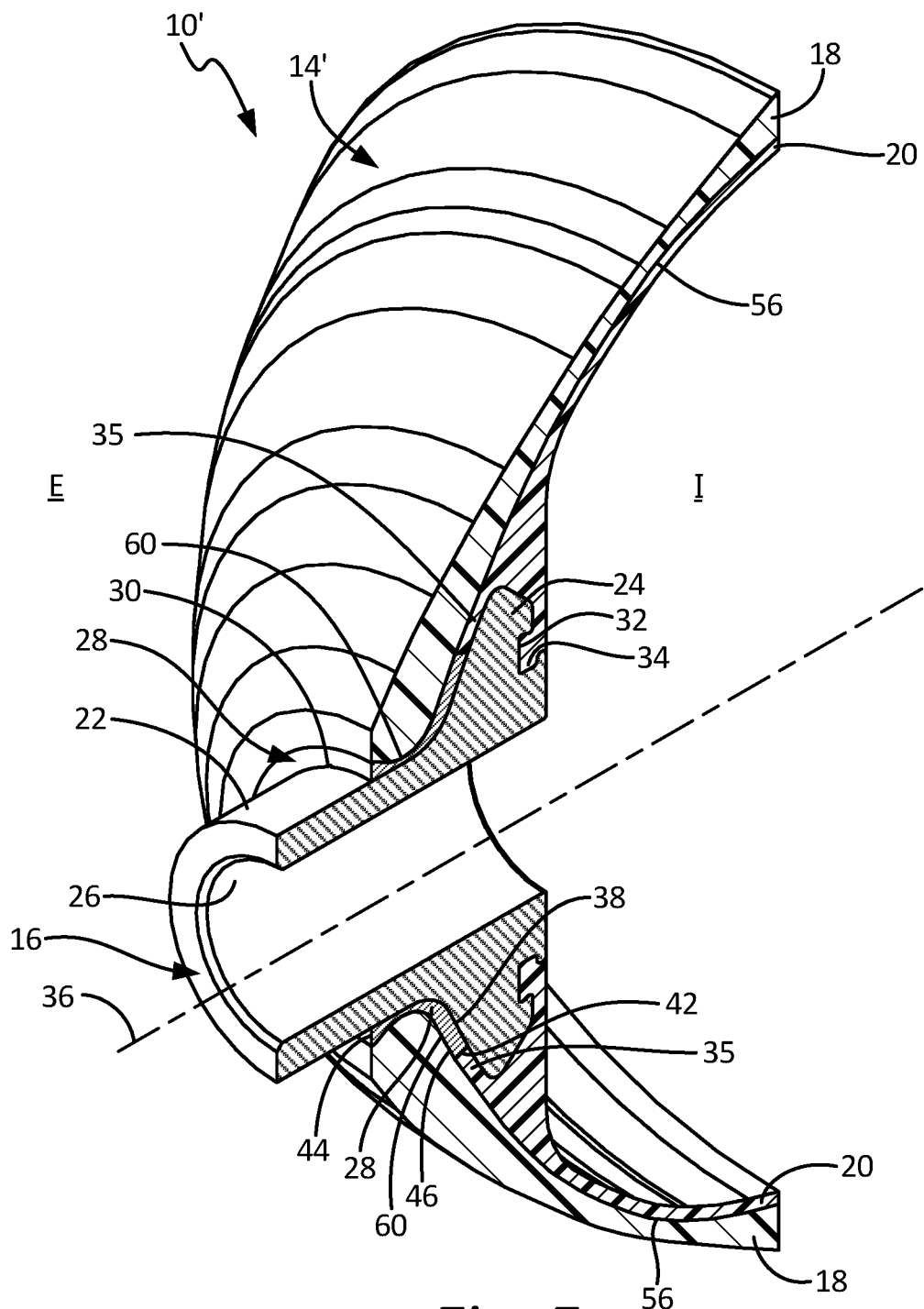
FIG. 5 is a partial perspective radial cross-sectional view of an end section of a pressure vessel having the exemplary assembly of FIG. 4 positioned at least partially within a shell of the pressure vessel, and having a liner of the pressure vessel formed therewith.

FIG. 3 shows exemplary embodiments of a boss 16 and an annular fitting 28. Boss 16 includes neck 22 having a port or bore 26 that allows fluid communication between an interior I of pressure vessel 10' and an environment E exterior to pressure vessel 10' (see FIG. 5). Port 26 has longitudinal axis 36. Boss 16 typically has an annular flange 24 extending radially outwardly from port 26 and configured to attach to a liner 20. In an exemplary embodiment, flange 24 has an annular groove 32 to accept a complementary annular tab 34 in liner 20, as shown in FIG. 5. Mechanical inter-locks (i.e., elements that are structurally inhibited from separation) are shown, but it is contemplated that other methods of mechanically, frictionally, or chemically (e.g., by the use of adhesives) securing liner 20 to boss 16 may be used. It is noted that, in an exemplary embodiment, a portion 35 of liner 20 extends over the external surface of flange 24 to aid in connecting liner 20 and boss 16.

In an exemplary embodiment, fitting 28 has a generally annular body. In this description, the term "annular" is not strictly ring-shaped, but more broadly describes a body that has a through-passage 40 between opposite ends 42 and 44. The body may have a generally radially symmetrical shape about longitudinal axis 36. The body may follow the contours of underlying boss 16 and/or liner 20. In the illustrated embodiments, a gas permeable feature on (i.e., on, in, or adjacent to) inner surface 38 is provided in the form of one or more channels (such as interior vent channels 30) on or through fitting 28 to fluidly connect the interface 56 between shell 20 and liner 18 to the environment exterior to vessel 10', via vent path 54, shown in exemplary embodiments in FIGS. 6 and 8. Fitting 28 thereby prevents fluid that has permeated through liner 20 and into the interface 56 from becoming trapped. Fitting 28 may be formed of a metallic or non-metallic material. For metallic materials, such as, for example, aluminum or steel, formation of fitting 28 by machining is especially suitable. For a non-metallic material, such as, for example, a polymer or composite material, formation of fitting 28 by injection molding is especially suitable. However, other known methods of part formation can also be used.

In an exemplary embodiment, fitting 28 is configured as a sleeve that has a neck 29 and a flange 31 that extends radially outward from neck 29. While only half of fitting 28 is shown, it is to be understood that the other half may be a mirror image of the illustrated half. Curved inner surface 38 of fitting 28 defines opening 40 and includes vent channels 30 that extend from end 42 of flange 31 to end 44 of neck 29. In an exemplary embodiment, a gas permeable feature includes channels 30, which are evenly spaced about the circumference of opening 40, have a substantially rectangular cross-sectional profile, and follow substantially straight paths (e.g., substantially aligned with longitudinal axis 36) on the curved inner surface 38 between end 42 and end 44. However, other gas permeable features including different channel configurations, vent structures, or mechanisms are contemplated. For example, inner surface 38 may include more or fewer channels and/or channels of various depths, widths, or shapes (e.g., curved channels and/or channels with generally hemispherical, elliptical or rounded cross-sectional shapes). Moreover, inner surface 38 may be at least partly formed of—or coated with—a gas-permeable material, and/or may include raised portions or bumps between which gas may flow from end 42 to end 44. In yet another embodiments, a gas permeable feature may include a layer of gas-permeable material provided on inner surface 38 and/or between inner surface 38 and an outer surface of boss 16.

In still another embodiment, a gas permeable feature may include longitudinal vents provided on an outer surface of liner 20 and/or boss 16, such as the longitudinal vents described in U.S. Patent Application Publication No. US 2012/0048865, entitled "Pressure Vessel Longitudinal Vents," which is hereby incorporated by reference in its entirety. Where the gas permeable feature is a longitudinal vent, a strip of a vent defining element is applied to an exterior surface of the liner 20. Suitable vent defining elements include, for example, a wire; fiber glass strands; open weave fiber glass tape; polyethylene; nylon release cloth; or a folded or unfolded strip of other textile or film. Fitting 28 in an exemplary embodiment is provided over and covers the vent defining element, so that the gas permeable feature is on (i.e., adjacent) inner surface 38 of fitting 28. Where the vent defining element may be a textile that has "wicking" properties (such as, for example, a glass cloth material), the gas permeable features are thereby protected by fitting 28 from resin infusion during subsequent formation of the composite shell 18 by resin and filament winding. Thus, fitting 28 prevents clogging of the porous characteristics of the gas permeable feature. A gas permeable feature may include either, or a combination of, channels and gas permeable materials in, on, or adjacent to inner surface 38 of fitting 28. Moreover, a gas permeable feature may extend beyond either end 42 or 44 of fitting 28.

In certain embodiments, the fitting 28 may not be completely annular, but instead may fit over one or more portions of the circumference of neck 22 instead of encircling the entirety of neck 22. In some embodiments, fitting 28 may be longer than illustrated, so that end 42 extends beyond flange 24 of boss 16. In such cases, fitting 28 may be fit around boss 16 and a portion of liner 20 after the formation of liner 20 on boss 16. Fitting 28 may even extend beyond domed end section 14 of pressure vessel 10 to main body section 12. Moreover, end 42 may taper in thickness. The venting mechanism may depend on the desired application, so long as fitting 28 allows for a gas-flow path from at least a portion of the interface 56 between liner 20 and shell 18 to the environment E external to pressure vessel 10'.

Figure 4:
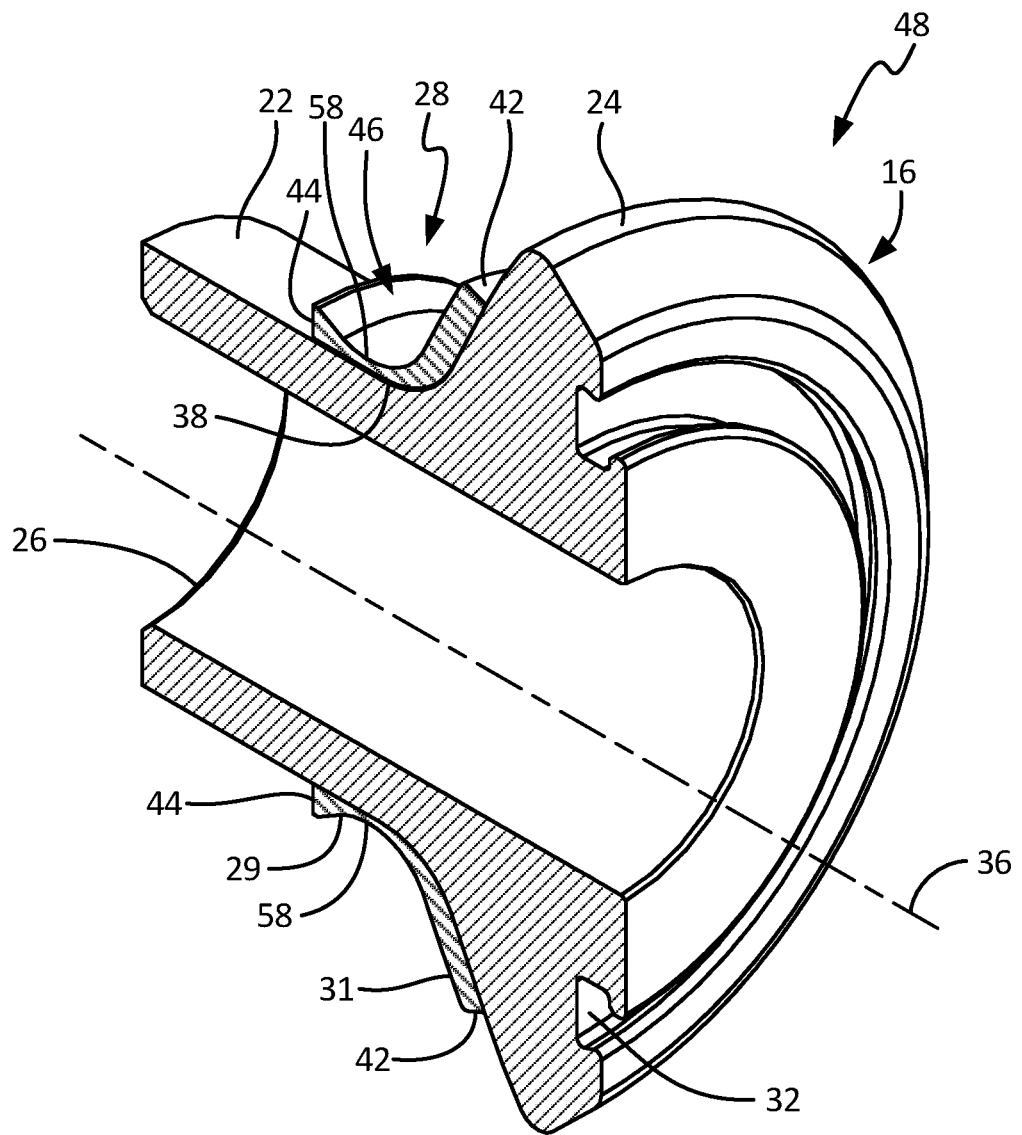
FIG. 4 is a radial cross-sectional view of an exemplary assembly of the vented fitting and boss of FIG. 3.

As shown in FIG. 4, an assembly 48 includes fitting 28 and boss 16. Neck 22 of boss 16 is inserted into opening 40 of fitting 28 such that neck 29 of fitting 28 fits over at least a portion of neck 22 of boss 16. Flange 31 of fitting 28 fits over at least a portion of flange 24 of boss 16 and optionally over a portion of liner 20. Inner surface 38 is contoured to substantially complement an outer contour of boss 16, including at least portions of neck 22 and flange 24, and optionally a portion of liner 20. An interference fit, complementary snap lock features, adhesive in tape or other form, or other means can be provided on fitting 28 and boss 16 and/or liner 20 to prevent unintentional separation.

Figure 7:
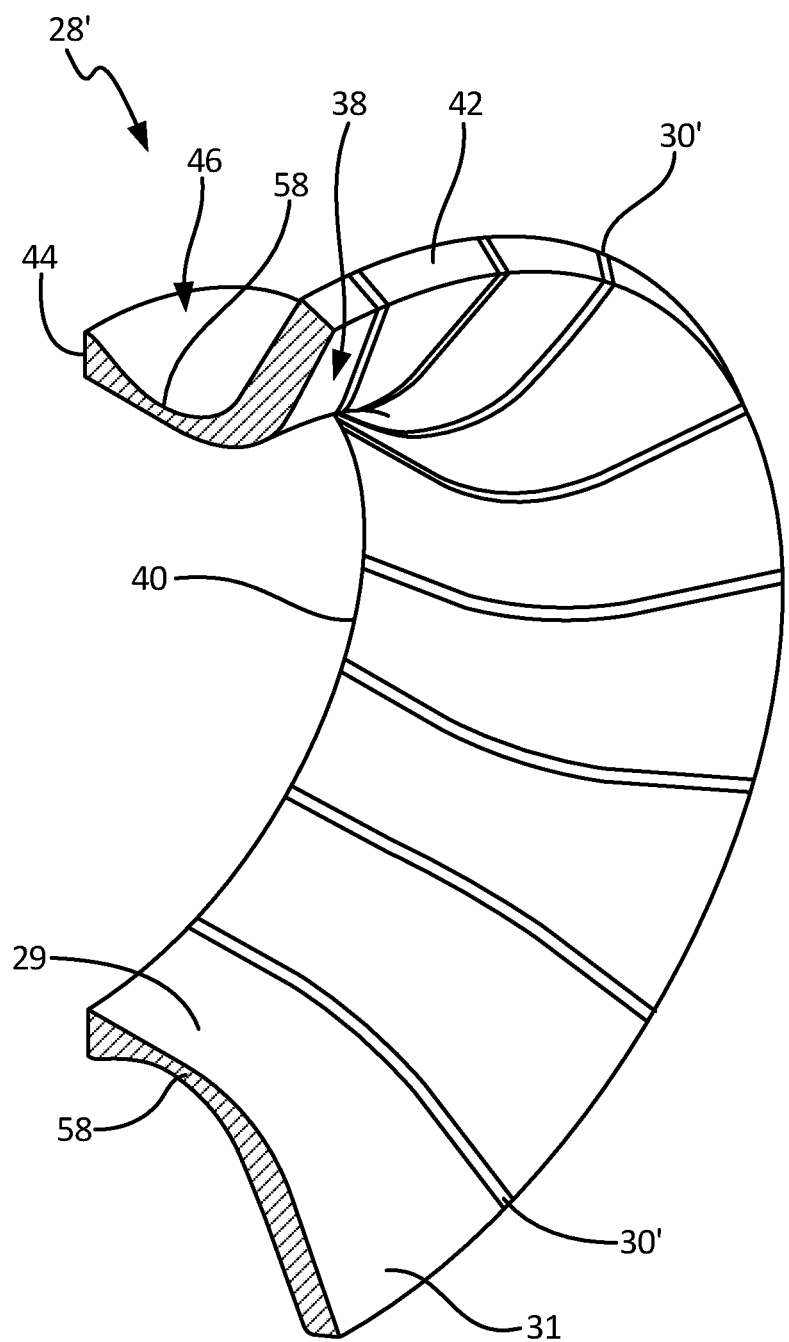
FIG. 7 is a radial cross-sectional view of a second exemplary embodiment of a vented fitting.

FIGS. 5 and 6 show an exemplary embodiment of assembly 48 on end section 14 of pressure vessel 10'. In an exemplary embodiment, to form pressure vessel 10', boss 16 is inserted into fitting 28 and mounted on a mandrel that is configured to define the shape of pressure vessel 10'. Fluid polymer (or other non-metallic) liner material is allowed to flow over the mandrel and about a portion of flange 24 so that liner material 20 fills groove 32 and abuts end 42 of fitting 28. In an exemplary embodiment of fitting 28', as shown in FIG. 7, channels 30' extend onto end 42 and liner material is allowed to flow over flange 31 in such a way that liner material does not enter or plug channels 30'. The polymer material solidifies to form liner 20.

In another method of pressure vessel formation, liner 20 is formed on a mandrel-mounted boss 16 without fitting 28. Gas permeable features such as longitudinal vent defining elements are placed on liner 20. Then fitting 28 is attached around boss 16, at least a portion of the gas permeable features, and optionally a portion of liner 20. The gas permeable features are thereby sandwiched between an outer surface of boss 16 and an inner surface 38 of fitting 28.

Shell 18 is formed by filament winding onto assembly 48 and liner 20, such that fitting 28 and portion 35 of liner 20 are sandwiched between shell 18 and flange 24 of boss 16. Shell 18 bonds to outer surface 46 of fitting 28, thereby preventing gas trapped between shell 18 and liner 20 from entering the interface 60 between shell 18 and fitting 28. Fitting 28 has channels 30 on inner surface 38 instead of outer surface 46 so that shell material does not fill channels 30 during formation of pressure vessel 10'.

As shown in FIG. 6, in an exemplary embodiment, inner surface 38 of fitting 28 abuts boss 16 in a manner that allows for gas venting through channels 30, which are in fluid communication with the interface 56 between liner 20 and shell 18. In an exemplary embodiment, neck 29 of fitting 28 is tapered from end 44 radially inward (as at 58) to provide a recess for shell 18 that prevents axial movement (such as along longitudinal axis 36) of shell 18 relative to assembly 48. In the illustrated embodiment, end 44 of fitting 28 and the adjacent gas permeable features (e.g., ends of channels 30), are exposed to the atmospheric environment exterior to pressure vessel 10' (e.g., at E of FIGS. 5, 6 and 8).

In the exemplary embodiment shown in FIG. 6, a pocket of gas 50 is trapped at an interface 56 between shell 18 and liner 20, causing a deformation 52 of liner 20. As shown by path 54, following a path of least resistance, gas 50 travels from deformation 52 along the interface 56 between liner 20 and shell 18 to end 42 of fitting 28. The gas enters channels 30 at end 42 and travels through channels 30 to end 44, where the gas 50 vents from channels 30 to the environment E external to pressure vessel 10'. Deformation 52 is shown to be a bulge or bubble in liner 20 near end section 14', but is shown as such merely for discussion purposes. Different amounts of gas 50 may exist anywhere in the interface 56 between liner 20 and shell 18. Moreover, the size of deformation 52 is greatly exaggerated for illustration purposes; it should be understood that in reality, the provision of fitting 28 on boss 16 allows for venting that prevents the formation of such deformations 52.

Figure 8:
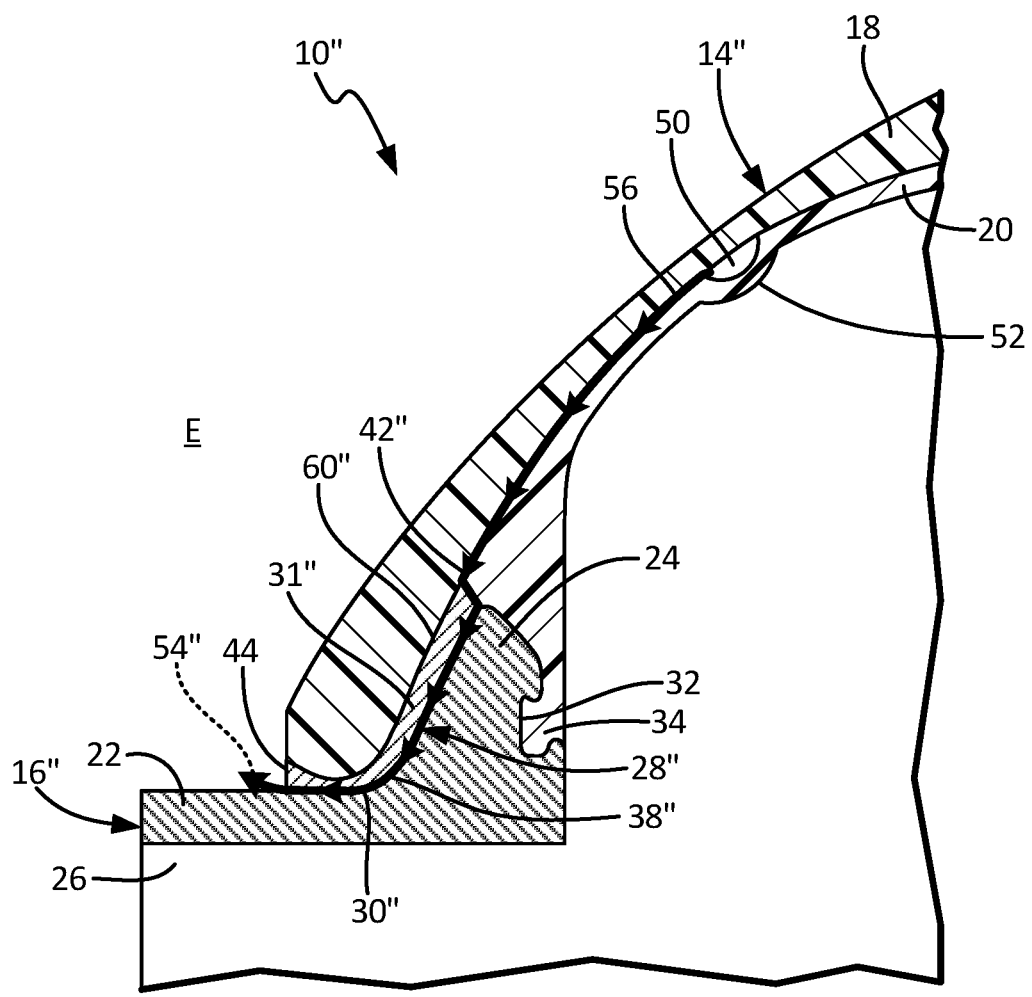
FIG. 8 is a partial radial cross-sectional view of an end section of a pressure vessel including a third exemplary embodiment of a vented fitting, showing a gas venting path from an exaggerated gas pocket.

FIG. 8 is a partial radial cross-sectional view of an end section of a pressure vessel 10" including a third exemplary embodiment of a vented fitting 28". In this embodiment, the radial extent of flange 31" of fitting 28" is substantially equal to the radial extent of flange 24 of boss 16. Moreover, end 42" of fitting 28" is tapered, thereby providing a smoother vent path 54" between deformation 52 and end 44 of fitting 28" that is exposed to the atmosphere outside of pressure vessel 10".

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. An apparatus configured to be positioned between a boss and a shell of a pressure vessel, the boss including a bore therethrough, and the bore having a longitudinal axis, the apparatus including:
  an annular body including:
    an inner surface configured to contact and abut the boss and an outer surface configured to abut the shell;
    opposite first and second ends relative to the longitudinal axis;
    a neck adjacent the first end; and
    a flange adjacent the second end, wherein the flange extends away from the longitudinal axis relative to the neck; and
  a gas permeable feature provided on the inner surface and extending at least from the first end to the second end.

2. The apparatus of claim 1, wherein the gas permeable feature includes a plurality of channels.

3. The apparatus of claim 2, wherein at least one of the plurality of channels is substantially aligned with the longitudinal axis.

4. The apparatus of claim 2, wherein at least some of the plurality of channels are substantially evenly circumferentially spaced about the inner surface.

5. The apparatus of claim 2, wherein at least one of the plurality of channels has a substantially rectangular cross-sectional profile.

6. The apparatus of claim 1, wherein the neck is tapered radially inward from the first end.

7. The apparatus of claim 1, wherein the second end abuts a liner disposed within the shell.

8. A pressure vessel including:
   a shell;
   a boss including a bore therethrough, the bore having a longitudinal axis;
   an apparatus positioned between the boss and the shell, the apparatus including:
      an annular body including:
         an inner surface configured to contact and abut the boss and an outer surface configured to abut the shell;
         opposite first and second ends relative to the longitudinal axis;
         a neck adjacent the first end; and
         a flange adjacent the second end, wherein the flange extends away from the longitudinal axis relative, to the neck; and
      a gas permeable feature provided on the inner surface and extending at least from the first end to the second end.

9. The pressure vessel of claim 8 including an interface between the liner and the shell, and wherein the gas permeable feature is in fluid communication with the interface at the second end and with an exterior of the vessel at the first end.

10. The pressure vessel of claim 8 wherein the gas permeable feature includes a plurality of channels.

11. The pressure vessel of claim 10 wherein at least one of the plurality of channels is substantially aligned with the longitudinal axis.

12. The pressure vessel of claim 10, wherein at least some of the plurality of channels are substantially evenly circumferentially spaced about the inner surface.

13. The pressure vessel of claim 8, wherein the neck is tapered radially inward from the first end.

14. The pressure vessel of claim 8, wherein the second end abuts a liner disposed within the shell.

15. The pressure vessel of claim 8, wherein the shell is bonded to an outer surface of the annular body.

* * * * *